(12) United States Patent
Stoffels et al.

(10) Patent No.: US 12,403,556 B2
(45) Date of Patent: Sep. 2, 2025

(54) TOOL PRESETTING WITH SCREEN-SUPPORTED TOOL MEASUREMENT

(71) Applicant: Franz Haimer Maschinenbau KG, Hollenbach-Igenhausen (DE)

(72) Inventors: Olaf Stoffels, Verl (DE); Shakeel Nisar, Bielefeld (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 0 days.

(21) Appl. No.: 18/607,772

(22) Filed: Mar. 18, 2024

(65) Prior Publication Data
US 2024/0308013 A1 Sep. 19, 2024

(30) Foreign Application Priority Data
Mar. 17, 2023 (DE) ............. 10 2023 106 788.5

(51) Int. Cl.
*B23Q 17/09* (2006.01)

(52) U.S. Cl.
CPC ...... *B23Q 17/0923* (2013.01); *B23Q 2717/00* (2013.01)

(58) Field of Classification Search
CPC . G01B 3/02; G01B 3/04; G01B 3/002; G01B 3/14; G01B 5/02; G01B 7/02; G01B 7/023; G01B 21/02; G01B 2210/40; G01B 2210/42
USPC .................... 33/483, 485, 493, 494
See application file for complete search history.

(56) References Cited

U.S. PATENT DOCUMENTS

| | | | | | |
|---|---|---|---|---|---|
| 4,628,609 | A | * | 12/1986 | Rieder | G01B 7/02 250/237 G |
| 6,845,565 | B2 | * | 1/2005 | Hajla | G06F 1/1607 33/436 |
| 7,479,949 | B2 | * | 1/2009 | Jobs | G06F 3/0488 345/169 |
| 7,624,511 | B1 | * | 12/2009 | Schmidt | G01B 3/56 33/529 |
| 7,665,220 | B1 | * | 2/2010 | Gee | G01B 3/10 33/511 |
| 9,161,716 | B2 | * | 10/2015 | Estocado | A61B 5/0077 |
| 10,489,033 | B2 | * | 11/2019 | Migos | G06F 3/0481 |
| 11,419,390 | B2 | * | 8/2022 | Kagami | G06Q 30/0631 |
| 11,852,469 | B2 | * | 12/2023 | Kan | G01B 5/24 |
| 12,058,797 | B2 | * | 8/2024 | Gallivanoni | H05B 6/062 |
| 2010/0088056 | A1 | * | 4/2010 | Igarashi | G01B 3/14 33/502 |
| 2016/0357430 | A1 | * | 12/2016 | Migos | G06F 3/04883 |

(Continued)

FOREIGN PATENT DOCUMENTS

DE 10317576 A1 11/2004

*Primary Examiner* — George B Bennett
(74) *Attorney, Agent, or Firm* — Laurence A. Greenberg; Werner H. Stemer; Ralph E. Locher

(57) ABSTRACT

A method for measuring a tool, a method for mounting a tool in a tool holder, a screen, a computing unit with such a screen and a presetting device and/or shrinking device with such a screen, and uses of a screen for measuring a tool. A method for measuring a tool using a screen by providing a display screen; and measuring the tool by way of the display screen. A tool measuring device having a display screen configured for measuring a tool. The display screen can have a measuring scale wherein the tool is measured by the measuring scale.

21 Claims, 2 Drawing Sheets

(56) References Cited

U.S. PATENT DOCUMENTS

2017/0285920 A1* 10/2017 Hatfield .............. G06F 3/04883
2019/0180487 A1*  6/2019 Abe ......................... G01B 3/18
2023/0109634 A1*  4/2023 Chassiboud ............. G01B 5/30
                                                            33/751
2023/0366665 A1* 11/2023 Roberts .................. G01B 3/004

* cited by examiner

TOOL PRESETTING WITH SCREEN-SUPPORTED TOOL MEASUREMENT

CROSS-REFERENCE TO RELATED APPLICATION

This application claims the priority, under 35 U.S.C. § 119, of German Patent Application DE 10 2023 106 788.5, filed Mar. 17, 2023; the prior application is herewith incorporated by reference in its entirety.

FIELD AND BACKGROUND OF THE INVENTION

The invention relates to a method for measuring a tool using a screen, a method for mounting a tool in a tool holder, a screen, a computing unit with such a screen and a presetting device and/or shrinking device with such a screen, and uses of a screen for measuring a tool.

It is known to clamp tools, such as rotary tools or/and turning tools, in particular milling or drilling tools, in specified target positions in tool holders, in which the tool has, or is intended to have, a certain (axial) unclamping length with respect to the tool holder.

Knowledge of the (exact) axial length of the tool is helpful or necessary for this.

In the state of the art, various methods and devices for measuring tools, specifically for measuring an axial length of a tool, are known.

DE 103 17 576 A1, for example, describes a length measuring module with the help of which the (axial) length of a rotary tool (before clamping) can be measured. For this purpose, the length measuring module has a measuring stand with a mechanical measuring element that can be moved on a guide.

SUMMARY OF THE INVENTION

The object of the invention is to provide a method and/or a device by means of which a tool, in particular its axial length, can be measured easily and cost-effectively.

This object is achieved by a method for measuring a tool using a screen, a method for mounting a tool in a tool holder, a screen, a computing unit having such a screen and a presetting device and/or shrinking device having such a screen and uses of a screen for measuring a tool having the features of the respective independent claim.

Advantageous developments of the invention are the subject of dependent claims and the following description—and refer to both the methods and the devices as well as to the uses.

Any terms used, such as above, below, front, rear, left or right—unless explicitly defined otherwise—are to be understood according to the usual understanding—also with regard to the present figures. Terms such as radial and axial, where used and not explicitly defined otherwise, are to be understood with reference to central or symmetry axes of components described here—also with regard to the present figures.

The term "essentially"—where used—can be understood (according to the highest court's understanding) as referring to "a practically still considerable extent". Possible deviations from exactness that are thus implied by this term may therefore arise unintentionally (that is to say without any functional basis) owing to manufacturing or assembly tolerances or the like.

The method for measuring a tool using a screen provides that the tool is measured using the screen as a measuring means.

The screen, in particular an interactive screen, provides—correspondingly—that the screen has been set up as a measuring means for measuring a tool.

In this case, "screen as measuring means" means that the screen—or one or more parts of it—is a direct measuring means of the measurement.

In other words, the screen—or one or more parts of it—is a direct or actual part of the measurement "as a measuring means".

Consequently, this does not include in particular screens that are merely display means for (measurement) results and/or form a control/operating interface for operating a measurement.

Here—in the case of such screens that are not included (simple display/operating screens)—the measurement would then be carried out by another, separate measuring means, such as a camera or a measuring module (cf. DE 103 17 576 A1). The screen is not the measuring means here.

Specifically clarified, also not meant is a screen with a—if necessary integrated, but separate—camera, which records the tool (by image technology), the tool then being measured by means of image processing using the camera image—or a (separate) measuring stand (cf. DE 103 17 576 A1), which is arranged next to the screen. Here, too, the screen is not the actual measuring means.

"Screen" can be understood in particular as meaning computer screens/displays, laptop screens/displays, tablet displays—or correspondingly similar display devices.

"Interactive screen" can be understood in particular as a screen which allows a reciprocal reaction between the screen and a "counterpart", for example an operator, for example so-called "touch screens".

"Measuring (a tool)" can be understood as meaning that at least one item of geometric information of the tool is obtained by the measuring process. In particular, it may be provided here that an axial length of a tool is measured. Diameters, radii and the like can also be measured in the case of a tool.

It may therefore be provided in particular during such measuring that the tool is brought into contact with the screen, in particular a screen surface, and/or the tool is in contact with the screen, in particular a screen surface, during the measurement. A close proximity to the screen or its screen surface may also be sufficient for the measurement.

According to one design, it is provided that the screen has a measuring scale, in particular that a measuring scale is arranged on the screen and/or that a virtual measuring scale is displayed on the screen, using which the tool is measured.

A measuring scale may be understood to be a reference system for a measured variable, such as for example a length, for example a metric system.

It may also be provided that the measuring scale has scaled areas, in particular (defined) length ranges, on the basis of which the tool to be measured is classified in terms of range during the measurement (scaling and classification of (length) ranges).

If, for example, a certain area (of the measuring scale) is therefore assigned to the tool when measuring a tool, further measurement information, such as a length range (or length) can be obtained from the definition of the assigned area.

Furthermore, it may also be provided that the screen has a vernier caliper, using which the tool is measured.

The vernier caliper may be a virtual vernier caliper which is displayed on the screen and/or which is operated interactively (on or via the screen)—or the vernier caliper is a vernier caliper which can be moved mechanically.

It may also be provided that the screen has a, in particular physical, stop, using which the tool—for example in combination with the virtual or physical vernier caliper of the screen—can be positioned for the measurement. In particular, such a stop may also form a reference or a reference point in combination with the measuring scale, in particular at it.

It is expedient here in particular if the, in particular physical, stop is designed in such a way that positioning errors can be excluded or reduced.

For example, a sufficient depth of the (positioning) stop can help here to avoid incorrect positioning of the tool at the stop, for example by a bevel of the tool lying against the (positioning) stop, leading to measurement errors. Also, such a (positioning) stop may have a predetermined geometric shape, which ensures safe "stopping" or positioning of the tool against it.

In the simplest design, such a stop may be for example a surface on a screen frame.

Additional further physical as well as virtual stops and/or positioning surfaces (on or at the screen), which facilitate the positioning of a tool to be measured during the measurement, may also be provided. For example, a (physical) bearing surface aligned (parallel) according to the measuring scale, on which a tool can be placed during the measurement.

Furthermore, it may also be provided that a screen surface of the screen has been set up in such a way with a sensor system, in particular a touch-sensitive sensor system—similar to in the case of a touch screen—, that, when the tool has been brought into contact with the screen surface (or in close proximity to it), the tool is measured automatically.

Furthermore, it may also be expedient that a parallax error is avoided and/or corrected when measuring the tool. Appropriate means, such as mirrors, may be provided on the screen for this. Appropriate virtual means may also be provided, the correction of the parallax error usually being calculated here.

Furthermore, it may also be expedient that the measuring means is calibrated, in particular using a reference body.

Furthermore, it is expedient in particular if the method for measuring a tool is carried out in a tool presetting and/or a clamping, in particular a clamping in a collet or a hydraulic expansion chuck, or a shrink-fitting of a tool into a tool holder, the clamping being carried out using the size of the tool measured by the measuring, in particular a measured axial length of the tool.

It is similarly expedient in particular if the screen (as a measuring means) is used for a measurement or for the method for measuring a tool, in particular carried out in a tool presetting and/or a clamping, in particular a clamping in a collet or a hydraulic expansion chuck, or a shrink-fitting of a tool into a tool holder, the clamping being carried out using the size of the tool measured by the method, in particular a measured axial length of the tool.

In other words, a presetting device and/or shrinking device may be equipped with the screen.

Furthermore, it is also expedient to provide a computing unit, for example in a presetting and/or shrinking device, which computing unit has the screen and/or in which computing unit executable programs for the method are implemented.

In the for mounting a tool in a tool holder, it is provided that a tool is measured method according to said method, in particular an axial tool length of the tool is measured, a stop element in the tool holder is positioned using the measurement result, in particular the axial length, the tool is inserted into the tool holder until it stops against the stop element and the tool is fixed in the inserted position in the tool holder.

Here it appears to be expedient in particular if the mounting method is carried out in a combined tool presetting and shrinking device.

The invention is distinguished in particular by the fact that it is easy to implement, in particular by integration into screens already present (for example) in presetting devices and/or shrinking devices, —and therefore leads to a simple, cost-effective or cost-effectively realizable, efficient and effective tool measurement, (for example) in a presetting and/or a tool shrink-fitting operation.

In particular, otherwise required additional equipment for tool measurement, such as additional measuring modules or measuring stands (cf. DE 103 17 576 A1), can be avoided by the invention.

The description given so far of advantageous designs of the invention includes numerous features that are reproduced in the individual dependent claims, in some cases together. However, these features may expediently also be considered individually and combined into appropriate further combinations.

Even though some terms are used in each case in the singular or in combination with a numeral in the description and/or in the patent claims, the scope of the invention is not intended to be limited to the singular or the respective numeral for these terms. Furthermore, the words "a" or "an" are not to be understood as numerical words, but rather as indefinite articles.

The properties, features and advantages of the invention described above and the manner in which they are achieved will become clearer and more clearly understandable in conjunction with the following description of the exemplary embodiments of the invention, which are explained in greater detail in conjunction with the drawings/figures (the same components and functions have the same designations in the drawings/figures).

The exemplary embodiments are used to explain the invention and do not restrict the invention to combinations of features, including with respect to functional features, that are specified therein. Furthermore, it is possible to this end for suitable features of each exemplary embodiment also to be considered explicitly in isolation, to be taken from one exemplary embodiment, introduced into another exemplary embodiment to supplement it and combined with any one of the claims.

Other features which are considered as characteristic for the invention are set forth in the appended claims.

Although the invention is illustrated and described herein as embodied in a tool presetting with screen-supported tool measurement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
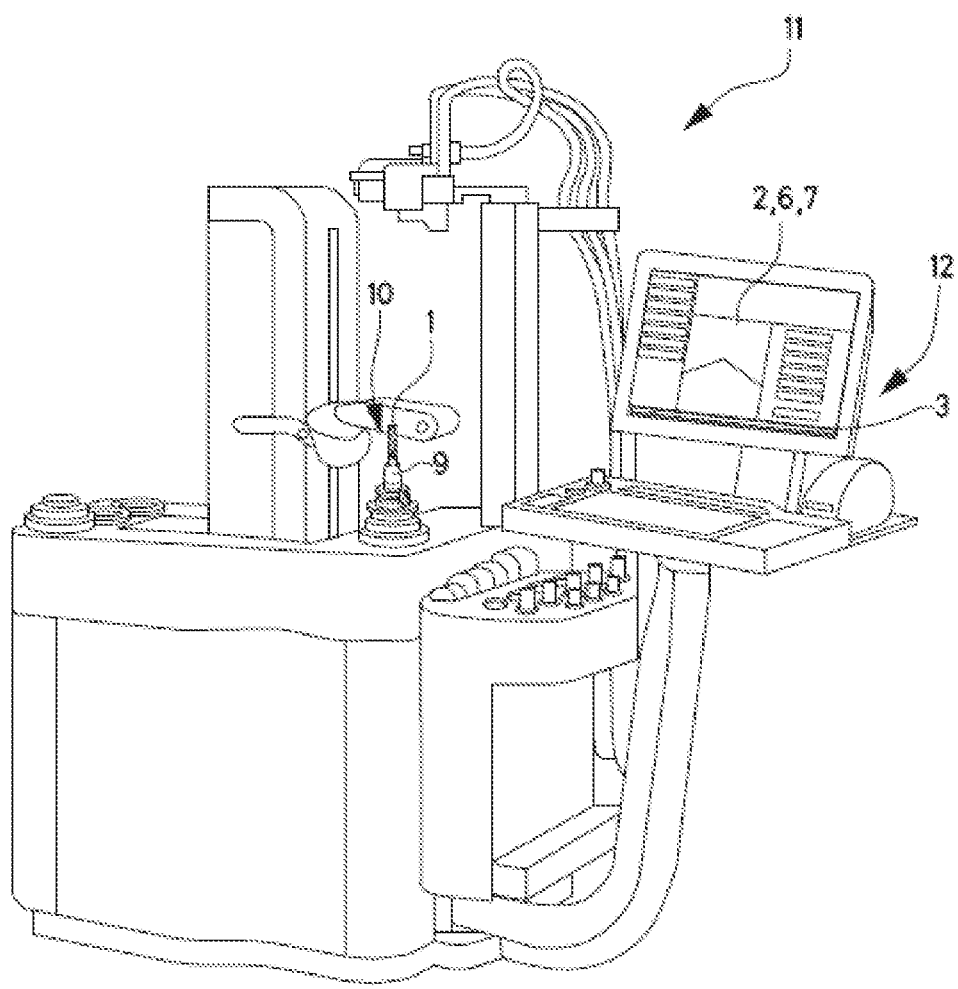
FIG. 1 shows a combined presetting and shrinking device with an interactive screen with a virtual measuring system (with a virtual vernier caliper) for measuring a tool according to one design.
Figure 2:
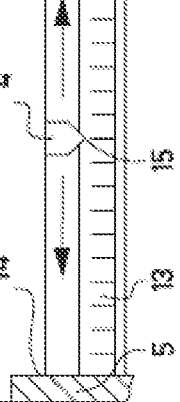
FIG. 2 shows the interactive screen with a virtual measuring system (with a virtual vernier caliper) for measuring a tool according to a design from FIG. 1.

FIG. 1 shows a combined presetting and shrinking device 11 with an interactive screen 2 with a virtual measuring system (with a virtual vernier caliper 4) for measuring a tool 1. FIG. 2 shows—in detail—this interactive screen 2 with the virtual measuring system (with the virtual vernier caliper 4) for measuring a tool 1.

FIG. 1 shows the combined presetting and shrinking device 11 as it is commonly encountered (and known)—in its basic functions, "presetting" and "shrinking"—(for example from: https://www.haimer.de/produkte/vorein-stelltechnik/voreinstellgeraete-der-vio-baureihe/vio-linear-toolshrink.html, available there on Feb. 7, 2023).

This combined presetting and shrinking device 11 (for simplicity just referred to hereinafter as presetting device 11 for short) provides as a further function (of the presetting device 11) a tool measurement in which a measurement of the tool 1 can be carried out (for example before a presetting and/or shrink-fitting of a tool 1 into a tool holder 9 by the presetting device 11).

In this measurement, the axial length of a tool 1, here a rotary tool 1, such as a milling tool 1, can be measured—and then the measured axial length of the tool 1 can be used in the presetting or in the shrink-fitting (of the measured tool 1 into a tool holder 9).

As FIG. 1 and in particular FIG. 2 show, the measuring device 2 that carries out this measurement is the screen 2 of the presetting device 11 directly and itself.

For this purpose, the screen 2 has been set up on the one hand as an interactive screen 2 with a touch-sensitive screen surface 6, via which the measurement can be carried out (by a user (not shown)); on the other hand, the screen 2 itself has been designed as a direct measuring means 2—with virtual measuring instruments—and therefore has been enabled accordingly (as a measuring means).

As can be seen from FIG. 2, at a lower end of the screen 2 or the screen surface 6 there is a (displayed) virtual measuring scale 3, a length scale 3, with a virtual vernier caliper 4 which is arranged in the plane of the virtual measuring scale 3 and can be moved on the virtual (and displayed) measuring scale 3 by a user—by means of touching the screen surface 6 as in the case of a touch screen.

The measuring scale 3 has been calibrated in such a way that a (virtual) scale section 13 there corresponds to a predetermined (real) length section (for example 5 mm).

The fact that the virtual vernier caliper 3 is in the plane of the measuring scale 4 (and can be moved there) means that a possible parallax error in this respect (between the pointer and the scale, as in other physical pointer systems in which the pointer is arranged at a spatial distance from the measuring scale) is avoided.

In addition, the virtual measuring scale 3 has been positioned or displayed on the screen 2 in such a way that its left starting point (zero point) comes to lie at a stop 5 arranged on the screen 2.

In brief, simple and descriptive terms, the stop 5 on screen 2 also forms the start/zero point 14 of the measuring scale 3—and therefore of the "measuring distance".

A sensor system 7 lying behind the screen surface 6 detects the position of the (virtual) vernier caliper 4—and a logic implemented in a computer unit 12 calculates—from the zero point 14 of the (virtual) measuring scale 3 and the position of the (virtual) vernier caliper 4 the (axial) length of the tool 1 to be measured.

When measuring a tool 1, it is placed by a user against the stop 5 with its first end, the shaft end, parallel to the measuring scale 3. The user moves the virtual vernier caliper 4, for example by touching it with their finger, to the second end of the tool 1, the cutting-edge end, until the virtual tip 15 of the vernier caliper 4 coincides with the cutting-edge tip of the tool 1.

The (axial) length of the tool 1 to be measured is calculated from the (known) zero point 14 of the (virtual) measuring scale 3 and the position of the (virtual) vernier caliper 4 (or its tip 15).

The measured value, i.e. the (axial) length of the measured tool 1, is stored, displayed and otherwise available via an interface.

A simplified representation 16 of a tool/tool-holder unit 10 displayed in a right-hand upper area of the screen 2 illustrates important length/dimension information in the case of the tool/tool-holder unit 10, such as the (axial) unclamping length (el (exposed length)), the A dimension (gl (gauge length)), the insertion depth (id (insert length)) and the (measured (axial) tool length (tl (tool length)).

As illustrated by FIG. 1—the measured (axial) length of the measured tool 1 can therefore be used on the presetting device 11 when shrink-fitting the tool 1 into a tool holder 9 (into a predetermined target position or to a predetermined target dimension).

For example, before the shrink-fitting of the tool 1, a stop element inside the tool holder 9 may be positioned while taking into account the tool length tl such that a predetermined unclamping length el results after the shrink-fitting operation.

Although the invention has been illustrated more specifically and described in more detail by the preferred exemplary embodiments, the invention is not restricted by the examples disclosed and other variations may be derived therefrom without departing from the scope of protection of the invention The following is a summary list of reference numerals and the corresponding structure used in the above description of the invention:

1 Tool, rotary tool, milling/drilling tool
2 (Interactive) screen, measuring means/system
3 (Virtual) measuring scale, length scale
4 (Virtual) vernier caliper
5 (Physical) stop
6 Screen surface
7 Sensor system
8 Reference body (not shown)
9 Tool holder
10 Tool/tool-holder unit
11 Presetting/shrinking device
12 Computing unit
13 Scale section
14 Zero point, left starting point
15 (Virtual) tip (of 4)
16 Representation (of 10)
el (exposed length) (axial) unclamping length
gl (gauge length) A dimension
id (insert length) insertion depth
tl (tool length) (axial) tool length to be measured

The invention claimed is:
1. A method for measuring a tool using a screen, the method comprising:

providing a display screen; and measuring the tool by way of the display screen.

2. The method according to claim 1, wherein the display screen has a measuring scale, and the tool is measured by the measuring scale.

3. The method according to claim 1, wherein the display screen has a vernier caliper, and the tool is measured by the vernier caliper.

4. The method according to claim 3, wherein:

the vernier caliper is a virtual vernier caliper, the virtual vernier caliper is displayed on the display screen and/or operated interactively; or the vernier caliper is a vernier caliper, which is mechanically movable.

5. The method according to claim 1, wherein the display screen has a stop, and the tool is positioned with the stop for the measurement.

6. The method according to claim 1, wherein a screen surface of the display screen has a sensor system, and the tool is measured automatically when the tool has been brought into contact with the screen surface.

7. The method according to claim 1, wherein during the measuring step, the tool is brought into contact with the display screen.

8. The method according to claim 1, further comprising correcting and/or preventing a parallax error when measuring the tool.

9. The method according to claim 1, further comprising calibrating the measurement of the display screen using a reference body.

10. The method according to claim 1, further comprising: providing the display screen with a tool presetting and/or clamping device; and carrying out a clamping using a length of the tool measured by the display screen.

11. A method for mounting a tool in a tool holder, the method comprising:

measuring the tool according to the method of claim 1;

positioning a stop element in the tool holder using the measurement result; and inserting the tool into the tool holder until it stops against the stop element and the tool is fixed in an inserted position in the tool holder.

12. A presetting device and/or shrinking device, comprising:

a tool measuring device having a display screen configured for measuring a tool.

13. The measuring device according to claim 12, further comprising a measuring scale on the display screen, and/or a virtual measuring scale displayed on the screen; and said measuring scale being configured for measuring the tool.

14. The measuring device according to claim 12, wherein the display screen has a vernier caliper and said vernier caliper is configured for measuring the tool.

15. The measuring device according to claim 14, wherein the vernier caliper is a virtual vernier caliper displayed on the screen and operated interactively; or the vernier caliper is a vernier caliper which can be moved mechanically.

16. The measuring device according to claim 12, wherein the display screen has a stop, said stop being configured for positioning the tool for the measurement.

17. The measuring device according to claim 12, wherein a screen surface of said display screen has a sensor system, such that the tool is measured automatically when brought into contact with the screen surface.

18. The measuring device according to claim 12, wherein the display screen is configured to correct and/or prevent a parallax error when measuring the tool.

19. The measuring device according to claim 12, further comprising a reference body configured for calibrating the measuring device.

20. The measuring device according to claim 12, wherein the display screen is operatively connected to a computing unit.

21. The measuring device according to claim 12, wherein the display screen is operatively connected to a presetting device and/or shrinking device.

* * * * *